United States Patent
Hinman et al.

(10) Patent No.: US 10,958,332 B2
(45) Date of Patent: Mar. 23, 2021

(54) WI-FI HOTSPOT REPEATER

(71) Applicant: Mimosa Networks, Inc., Santa Clara, CA (US)

(72) Inventors: Brian L. Hinman, Los Gatos, CA (US); Mustafa Rangwala, Sunnyvale, CA (US); Jaime Fink, San Francisco, CA (US)

(73) Assignee: Mimosa Networks, Inc., Santa Clara, CA (US)

(*) Notice: Subject to any disclaimer, the term of this patent is extended or adjusted under 35 U.S.C. 154(b) by 0 days.

(21) Appl. No.: 14/848,202

(22) Filed: Sep. 8, 2015

(65) Prior Publication Data

US 2016/0149635 A1    May 26, 2016

Related U.S. Application Data

(60) Provisional application No. 62/047,640, filed on Sep. 8, 2014.

(51) Int. Cl.
*H04B 7/155* (2006.01)
*H04B 7/04* (2017.01)
(Continued)

(52) U.S. Cl.
CPC ......... *H04B 7/15507* (2013.01); *H04B 7/026* (2013.01); *H04B 7/0413* (2013.01)

(58) Field of Classification Search
CPC .. H04B 7/026; H04B 7/0413; H04B 7/15507; H04W 16/28; H04W 52/343; H04W 28/12
See application file for complete search history.

(56) References Cited

U.S. PATENT DOCUMENTS 2,735,993 A    2/1956    Humphrey
3,182,129 A    5/1965    Clark et al.
(Continued)

FOREIGN PATENT DOCUMENTS

CN    104335654       2/2015
CN    303453662 S    11/2015
(Continued)

OTHER PUBLICATIONS

Weisstein, Eric "Electric Polarization", Retrieved from the Internet [retrieved Mar. 23, 2007] available at <http://scienceworld.wolfram.com/physics/ElectricPolarization.html>, 1 page.

(Continued)

*Primary Examiner* — Kevin C. Harper
*Assistant Examiner* — Derrick V Rose
(74) *Attorney, Agent, or Firm* — Carr & Ferrell LLP

(57) ABSTRACT

WiFi repeater devices described provided herein. An example device includes an enclosure that is configured to be mounted to a window that divides an outdoor area from an indoor area. The enclosure houses a 5 GHz WiFi client radio coupled with a high order MIMO (multiple input, multiple output) antenna, the high order MIMO antenna transmitting and receiving data from a 5 GHz access point located in the outdoor area, and a 2.4 GHz WiFi access point radio coupled with a MIMO (multiple input, multiple output) antenna, the MIMO antenna transmitting and receiving data from 2.4 GHz UEs located in the indoor area.

16 Claims, 5 Drawing Sheets

(51) Int. Cl.
*H04B 7/0413* (2017.01)
*H04B 7/026* (2017.01)

(56) References Cited

U.S. PATENT DOCUMENTS

| | | | |
|---|---|---|---|
| D227,476 S | 6/1973 | Kennedy |
| 4,188,633 A | 2/1980 | Frazita |
| 4,402,566 A | 9/1983 | Powell et al. |
| D273,111 S | 3/1984 | Hirata et al. |
| 4,543,579 A | 9/1985 | Teshirogi |
| 4,562,416 A | 12/1985 | Sedivec |
| 4,626,863 A | 12/1986 | Knop et al. |
| 4,835,538 A | 5/1989 | McKenna et al. |
| 4,866,451 A | 9/1989 | Chen |
| 4,893,288 A | 1/1990 | Maier et al. |
| 4,903,033 A | 2/1990 | Tsao et al. |
| 4,986,764 A | 1/1991 | Eaby et al. |
| 5,015,195 A | 5/1991 | Piriz |
| 5,087,920 A | 2/1992 | Tsurumaru et al. |
| 5,226,837 A | 7/1993 | Cinibulk et al. |
| 5,231,406 A | 7/1993 | Sreenivas |
| D346,598 S | 5/1994 | McCay et al. |
| D355,416 S | 2/1995 | McCay et al. |
| 5,389,941 A | 2/1995 | Yu |
| 5,491,833 A | 2/1996 | Hamabe |
| 5,513,380 A | 4/1996 | Ivanov et al. |
| 5,539,361 A | 7/1996 | Davidovitz |
| 5,561,434 A | 10/1996 | Yamazaki |
| D375,501 S | 11/1996 | Lee et al. |
| 5,580,264 A | 12/1996 | Aoyama et al. |
| 5,684,495 A | 11/1997 | Dyott et al. |
| D389,575 S | 1/1998 | Grasfield et al. |
| 5,724,666 A | 3/1998 | Dent |
| 5,742,911 A | 4/1998 | Dumbrill et al. |
| 5,746,611 A | 5/1998 | Brown et al. |
| 5,764,696 A | 6/1998 | Barnes et al. |
| 5,797,083 A * | 8/1998 | Anderson ............ H01Q 1/1257 342/359 |
| 5,831,582 A | 11/1998 | Muhlhauser et al. |
| 5,966,102 A | 10/1999 | Runyon |
| 5,995,063 A | 11/1999 | Somoza et al. |
| 6,014,372 A | 1/2000 | Kent et al. |
| 6,067,053 A | 5/2000 | Runyon et al. |
| 6,137,449 A | 10/2000 | Kildal |
| 6,140,962 A | 10/2000 | Groenenboom |
| 6,176,739 B1 | 1/2001 | Denlinger et al. |
| 6,216,266 B1 | 4/2001 | Eastman et al. |
| 6,271,802 B1 | 8/2001 | Clark et al. |
| 6,304,762 B1 | 10/2001 | Myers et al. |
| D455,735 S | 4/2002 | Winslow |
| 6,421,538 B1 | 7/2002 | Byrne |
| 6,716,063 B1 | 4/2004 | Bryant et al. |
| 6,754,511 B1 | 6/2004 | Halford et al. |
| 6,847,653 B1 | 1/2005 | Smiroldo |
| D501,848 S | 2/2005 | Uehara et al. |
| 6,853,336 B2 | 2/2005 | Asano et al. |
| 6,864,837 B2 | 3/2005 | Runyon et al. |
| 6,877,277 B2 | 4/2005 | Kussel et al. |
| 6,962,445 B2 | 11/2005 | Zimmel et al. |
| 7,075,492 B1 | 7/2006 | Chen et al. |
| D533,899 S | 12/2006 | Ohashi et al. |
| 7,173,570 B1 | 2/2007 | Wensink et al. |
| 7,187,328 B2 | 3/2007 | Tanaka et al. |
| 7,193,562 B2 | 3/2007 | Shtrom et al. |
| 7,212,162 B2 | 5/2007 | Jung et al. |
| 7,212,163 B2 | 5/2007 | Huang et al. |
| 7,245,265 B2 | 7/2007 | Kienzle et al. |
| 7,253,783 B2 | 8/2007 | Chiang et al. |
| 7,264,494 B2 | 9/2007 | Kennedy et al. |
| 7,281,856 B2 | 10/2007 | Grzegorzewska et al. |
| 7,292,198 B2 | 11/2007 | Shtrom et al. |
| 7,306,485 B2 | 12/2007 | Masuzaki |
| 7,316,583 B1 | 1/2008 | Mistarz |
| 7,324,057 B2 | 1/2008 | Argaman et al. |
| D566,698 S | 4/2008 | Choi et al. |
| 7,362,236 B2 | 4/2008 | Hoiness |
| 7,369,095 B2 | 5/2008 | Hirtzlin et al. |
| 7,380,984 B2 | 6/2008 | Wuester |
| 7,431,602 B2 | 10/2008 | Corona |
| 7,436,373 B1 | 10/2008 | Lopes et al. |
| 7,498,896 B2 | 3/2009 | Shi |
| 7,498,996 B2 | 3/2009 | Shtrom et al. |
| 7,507,105 B1 | 3/2009 | Peters et al. |
| 7,522,095 B1 | 4/2009 | Wasiewicz et al. |
| 7,542,717 B2 | 6/2009 | Green, Sr. et al. |
| 7,581,976 B2 | 9/2009 | Liepold et al. |
| 7,586,891 B1 | 9/2009 | Masciulli |
| 7,616,959 B2 | 11/2009 | Spenik et al. |
| 7,646,343 B2 | 1/2010 | Shtrom et al. |
| 7,675,473 B2 | 3/2010 | Kienzle et al. |
| 7,675,474 B2 | 3/2010 | Shtrom et al. |
| 7,726,997 B2 | 6/2010 | Kennedy et al. |
| 7,778,226 B2 | 8/2010 | Rayzman et al. |
| 7,857,523 B2 | 12/2010 | Masuzaki |
| 7,929,914 B2 | 4/2011 | Tegreene |
| RE42,522 E | 7/2011 | Zimmel et al. |
| 8,009,646 B2 | 8/2011 | Lastinger et al. |
| 8,069,465 B1 | 11/2011 | Bartholomay et al. |
| 8,111,678 B2 | 2/2012 | Lastinger et al. |
| 8,254,844 B2 | 8/2012 | Kuffner et al. |
| 8,270,383 B2 | 9/2012 | Lastinger et al. |
| 8,275,265 B2 | 9/2012 | Kobyakov et al. |
| 8,325,695 B2 | 12/2012 | Lastinger et al. |
| D674,787 S | 1/2013 | Tsuda et al. |
| 8,345,651 B2 | 1/2013 | Lastinger et al. |
| 8,385,305 B1 | 2/2013 | Negus et al. |
| 8,425,260 B2 | 4/2013 | Seefried et al. |
| 8,482,478 B2 | 7/2013 | Hartenstein |
| 8,515,434 B1 | 8/2013 | Narendran et al. |
| 8,515,495 B2 | 8/2013 | Shang et al. |
| D694,740 S | 12/2013 | Apostolakis |
| 8,777,660 B2 | 7/2014 | Chiarelli et al. |
| 8,792,759 B2 | 7/2014 | Benton et al. |
| 8,827,729 B2 | 9/2014 | Gunreben et al. |
| 8,836,601 B2 | 9/2014 | Sanford et al. |
| 8,848,389 B2 | 9/2014 | Kawamura et al. |
| 8,870,069 B2 | 10/2014 | Bellows |
| 8,935,122 B2 | 1/2015 | Stisser |
| 9,001,689 B1 | 4/2015 | Hinman et al. |
| 9,019,874 B2 | 4/2015 | Choudhury et al. |
| 9,077,071 B2 | 7/2015 | Shtrom et al. |
| 9,107,134 B1 | 8/2015 | Belser et al. |
| 9,130,305 B2 | 9/2015 | Ramos et al. |
| 9,161,387 B2 | 10/2015 | Fink et al. |
| 9,179,336 B2 | 11/2015 | Fink et al. |
| 9,191,081 B2 | 11/2015 | Hinman et al. |
| D752,566 S | 3/2016 | Hinman et al. |
| 9,295,103 B2 | 3/2016 | Fink et al. |
| 9,362,629 B2 | 6/2016 | Hinman et al. |
| 9,391,375 B1 | 7/2016 | Bales et al. |
| 9,407,012 B2 | 8/2016 | Shtrom et al. |
| 9,431,702 B2 | 8/2016 | Hartenstein |
| 9,504,049 B2 | 11/2016 | Hinman et al. |
| 9,531,114 B2 | 12/2016 | Ramos et al. |
| 9,537,204 B2 | 1/2017 | Cheng et al. |
| 9,577,340 B2 | 2/2017 | Fakharzadeh et al. |
| 9,693,388 B2 | 6/2017 | Fink et al. |
| 9,780,892 B2 | 10/2017 | Hinman et al. |
| 9,843,940 B2 | 12/2017 | Hinman et al. |
| 9,871,302 B2 | 1/2018 | Hinman et al. |
| 9,888,485 B2 | 2/2018 | Hinman et al. |
| 9,930,592 B2 | 3/2018 | Hinman |
| 9,949,147 B2 | 4/2018 | Hinman et al. |
| 9,986,565 B2 | 5/2018 | Fink et al. |
| 9,998,246 B2 | 6/2018 | Hinman et al. |
| 10,028,154 B2 | 7/2018 | Elson |
| 10,090,943 B2 | 10/2018 | Hinman et al. |
| 10,096,933 B2 | 10/2018 | Ramos et al. |
| 10,117,114 B2 | 10/2018 | Hinman et al. |
| 10,186,786 B2 | 1/2019 | Hinman et al. |
| 10,200,925 B2 | 2/2019 | Hinman |
| 10,257,722 B2 | 4/2019 | Hinman et al. |
| 10,425,944 B2 | 9/2019 | Fink et al. |
| 10,447,417 B2 | 10/2019 | Hinman et al. |

(56) References Cited

U.S. PATENT DOCUMENTS

| | | |
|---|---|---|
| 10,511,074 B2 | 12/2019 | Eberhardt et al. |
| 10,595,253 B2 | 3/2020 | Hinman |
| 10,616,903 B2 | 4/2020 | Hinman et al. |
| 10,714,805 B2 | 7/2020 | Eberhardt et al. |
| 10,742,275 B2 | 8/2020 | Hinman |
| 10,785,608 B2 | 9/2020 | Fink et al. |
| 10,790,613 B2 | 9/2020 | Ramos et al. |
| 10,812,994 B2 | 10/2020 | Hinman et al. |
| 10,863,507 B2 | 12/2020 | Fink et al. |
| 2001/0033600 A1 | 10/2001 | Yang et al. |
| 2002/0102948 A1 | 8/2002 | Stanwood et al. |
| 2002/0159434 A1 | 10/2002 | Gosior et al. |
| 2003/0013452 A1 | 1/2003 | Hunt et al. |
| 2003/0027577 A1 | 2/2003 | Brown et al. |
| 2003/0169763 A1 | 9/2003 | Choi et al. |
| 2003/0222831 A1 | 12/2003 | Dunlap |
| 2003/0224741 A1 | 12/2003 | Sugar et al. |
| 2004/0002357 A1 | 1/2004 | Benveniste |
| 2004/0029549 A1 | 2/2004 | Fikart |
| 2004/0110469 A1* | 6/2004 | Judd ................. G01S 19/25 455/15 |
| 2004/0120277 A1 | 6/2004 | Holur et al. |
| 2004/0155819 A1 | 8/2004 | Martin et al. |
| 2004/0196812 A1 | 10/2004 | Barber |
| 2004/0196813 A1 | 10/2004 | Ofek et al. |
| 2004/0240376 A1 | 12/2004 | Wang et al. |
| 2004/0242274 A1 | 12/2004 | Corbett et al. |
| 2005/0012665 A1 | 1/2005 | Runyon et al. |
| 2005/0032479 A1 | 2/2005 | Miller et al. |
| 2005/0058111 A1 | 3/2005 | Hung et al. |
| 2005/0124294 A1 | 6/2005 | Wentink |
| 2005/0143014 A1 | 6/2005 | Li et al. |
| 2005/0152323 A1* | 7/2005 | Bonnassieux ........ C07D 207/34 370/338 |
| 2005/0195758 A1 | 9/2005 | Chitrapu |
| 2005/0227625 A1 | 10/2005 | Diener |
| 2005/0254442 A1* | 11/2005 | Proctor, Jr. .......... H04B 7/1555 370/294 |
| 2005/0271056 A1 | 12/2005 | Kaneko |
| 2005/0275527 A1* | 12/2005 | Kates ................. G08B 1/08 340/539.22 |
| 2006/0025072 A1* | 2/2006 | Pan .................... H04W 52/242 455/11.1 |
| 2006/0072518 A1 | 4/2006 | Pan et al. |
| 2006/0098592 A1* | 5/2006 | Proctor, Jr. ............ H04B 7/026 370/315 |
| 2006/0099940 A1 | 5/2006 | Pfleging et al. |
| 2006/0132359 A1 | 6/2006 | Chang et al. |
| 2006/0132602 A1 | 6/2006 | Muto et al. |
| 2006/0172578 A1 | 8/2006 | Parsons |
| 2006/0187952 A1 | 8/2006 | Kappes et al. |
| 2006/0211430 A1 | 9/2006 | Persico |
| 2006/0276073 A1 | 12/2006 | McMurray et al. |
| 2007/0001910 A1 | 1/2007 | Yamanaka et al. |
| 2007/0019664 A1 | 1/2007 | Benveniste |
| 2007/0035463 A1 | 2/2007 | Hirabayashi |
| 2007/0060158 A1 | 3/2007 | Medepalli et al. |
| 2007/0132643 A1 | 6/2007 | Durham et al. |
| 2007/0173199 A1 | 7/2007 | Sinha |
| 2007/0173260 A1 | 7/2007 | Love et al. |
| 2007/0202809 A1 | 8/2007 | Lastinger et al. |
| 2007/0210974 A1 | 9/2007 | Chiang |
| 2007/0223701 A1 | 9/2007 | Emeott et al. |
| 2007/0238482 A1 | 10/2007 | Rayzman et al. |
| 2007/0255797 A1 | 11/2007 | Dunn et al. |
| 2007/0268848 A1 | 11/2007 | Khandekar et al. |
| 2008/0109051 A1 | 5/2008 | Splinter et al. |
| 2008/0112380 A1 | 5/2008 | Fischer |
| 2008/0192707 A1 | 8/2008 | Xhafa et al. |
| 2008/0218418 A1 | 9/2008 | Gillette |
| 2008/0231541 A1 | 9/2008 | Teshirogi et al. |
| 2008/0242342 A1 | 10/2008 | Rofougaran |
| 2009/0046673 A1 | 2/2009 | Kaidar |
| 2009/0051597 A1 | 2/2009 | Wen et al. |
| 2009/0052362 A1 | 2/2009 | Meier et al. |
| 2009/0059794 A1 | 3/2009 | Frei |
| 2009/0075606 A1 | 3/2009 | Shtrom et al. |
| 2009/0096699 A1 | 4/2009 | Chiu et al. |
| 2009/0232026 A1 | 9/2009 | Lu |
| 2009/0233475 A1 | 9/2009 | Mildon et al. |
| 2009/0291690 A1 | 11/2009 | Guvenc et al. |
| 2009/0315792 A1 | 12/2009 | Miyashita et al. |
| 2010/0029282 A1 | 2/2010 | Stamoulis et al. |
| 2010/0034191 A1 | 2/2010 | Schulz |
| 2010/0039340 A1 | 2/2010 | Brown |
| 2010/0046650 A1 | 2/2010 | Jongren et al. |
| 2010/0067505 A1 | 3/2010 | Fein et al. |
| 2010/0085950 A1 | 4/2010 | Sekiya et al. |
| 2010/0091818 A1 | 4/2010 | Sen et al. |
| 2010/0103065 A1 | 4/2010 | Shtrom et al. |
| 2010/0103066 A1 | 4/2010 | Shtrom et al. |
| 2010/0119002 A1 | 5/2010 | Hartenstein |
| 2010/0136978 A1 | 6/2010 | Cho et al. |
| 2010/0151877 A1 | 6/2010 | Lee et al. |
| 2010/0167719 A1 | 7/2010 | Sun |
| 2010/0171665 A1 | 7/2010 | Nogami |
| 2010/0171675 A1 | 7/2010 | Borja et al. |
| 2010/0177660 A1* | 7/2010 | Essinger ................. H04W 4/50 370/254 |
| 2010/0189005 A1 | 7/2010 | Bertani et al. |
| 2010/0202613 A1 | 8/2010 | Ray et al. |
| 2010/0210147 A1 | 8/2010 | Hauser |
| 2010/0216412 A1 | 8/2010 | Rofougaran |
| 2010/0225529 A1 | 9/2010 | Landreth et al. |
| 2010/0238083 A1 | 9/2010 | Malasani |
| 2010/0304680 A1 | 12/2010 | Kuffner et al. |
| 2010/0311321 A1 | 12/2010 | Morin |
| 2010/0315307 A1 | 12/2010 | Syed et al. |
| 2010/0329919 A1 | 12/2010 | Fischer et al. |
| 2011/0006956 A1 | 1/2011 | McCown |
| 2011/0028097 A1 | 2/2011 | Memik et al. |
| 2011/0032159 A1 | 2/2011 | Wu et al. |
| 2011/0044186 A1 | 2/2011 | Jung et al. |
| 2011/0090129 A1 | 4/2011 | Weily et al. |
| 2011/0103309 A1 | 5/2011 | Wang et al. |
| 2011/0111715 A1 | 5/2011 | Buer et al. |
| 2011/0112717 A1 | 5/2011 | Resner |
| 2011/0133996 A1 | 6/2011 | Alapuranen |
| 2011/0170424 A1 | 7/2011 | Safavi |
| 2011/0172916 A1 | 7/2011 | Pakzad et al. |
| 2011/0182260 A1 | 7/2011 | Sivakumar et al. |
| 2011/0182277 A1 | 7/2011 | Shapira |
| 2011/0194644 A1 | 8/2011 | Liu et al. |
| 2011/0206012 A1 | 8/2011 | Youn et al. |
| 2011/0241969 A1 | 10/2011 | Zhang et al. |
| 2011/0243291 A1 | 10/2011 | McAllister et al. |
| 2011/0256874 A1 | 10/2011 | Hayama et al. |
| 2011/0291914 A1 | 12/2011 | Lewry et al. |
| 2012/0008542 A1 | 1/2012 | Koleszar et al. |
| 2012/0040700 A1 | 2/2012 | Gomes et al. |
| 2012/0057533 A1 | 3/2012 | Junell et al. |
| 2012/0093091 A1 | 4/2012 | Kang et al. |
| 2012/0115487 A1 | 5/2012 | Josso |
| 2012/0134280 A1 | 5/2012 | Rotvold et al. |
| 2012/0140651 A1 | 6/2012 | Nicoara et al. |
| 2012/0200449 A1 | 8/2012 | Bielas |
| 2012/0238201 A1 | 9/2012 | Du et al. |
| 2012/0263145 A1 | 10/2012 | Marinier et al. |
| 2012/0282868 A1* | 11/2012 | Hahn .................... H01Q 3/242 455/90.3 |
| 2012/0299789 A1 | 11/2012 | Orban et al. |
| 2012/0314634 A1 | 12/2012 | Sekhar |
| 2013/0003645 A1* | 1/2013 | Shapira ............. H04B 7/15507 370/315 |
| 2013/0005350 A1 | 1/2013 | Campos et al. |
| 2013/0023216 A1 | 1/2013 | Moscibroda et al. |
| 2013/0044028 A1 | 2/2013 | Lea et al. |
| 2013/0064161 A1 | 3/2013 | Hedayat et al. |
| 2013/0082899 A1 | 4/2013 | Gomi |
| 2013/0095747 A1 | 4/2013 | Moshfeghi |
| 2013/0128858 A1 | 5/2013 | Zou et al. |
| 2013/0176902 A1 | 7/2013 | Wentink et al. |
| 2013/0182652 A1 | 7/2013 | Tong et al. |

(56) References Cited

U.S. PATENT DOCUMENTS

| | | |
|---|---|---|
| 2013/0195081 A1 | 8/2013 | Merlin et al. |
| 2013/0210457 A1 | 8/2013 | Kummetz |
| 2013/0223398 A1 | 8/2013 | Li |
| 2013/0234898 A1 | 9/2013 | Leung et al. |
| 2013/0271319 A1 | 10/2013 | Trerise |
| 2013/0286950 A1 | 10/2013 | Pu |
| 2013/0286959 A1 | 10/2013 | Lou et al. |
| 2013/0288735 A1 | 10/2013 | Guo |
| 2013/0301438 A1 | 11/2013 | Li et al. |
| 2013/0322276 A1 | 12/2013 | Pelletier et al. |
| 2013/0322413 A1 | 12/2013 | Pelletier et al. |
| 2014/0024328 A1 | 1/2014 | Balbien et al. |
| 2014/0051357 A1 | 2/2014 | Steer et al. |
| 2014/0098748 A1 | 4/2014 | Chan et al. |
| 2014/0113676 A1* | 4/2014 | Hamalainen ........ H04W 72/046 455/522 |
| 2014/0145890 A1 | 5/2014 | Ramberg et al. |
| 2014/0154895 A1 | 6/2014 | Poulsen et al. |
| 2014/0185494 A1 | 7/2014 | Yang et al. |
| 2014/0191918 A1 | 7/2014 | Cheng et al. |
| 2014/0198867 A1 | 7/2014 | Sturkovich et al. |
| 2014/0206322 A1 | 7/2014 | Dimou et al. |
| 2014/0225788 A1 | 8/2014 | Schulz et al. |
| 2014/0233613 A1 | 8/2014 | Fink et al. |
| 2014/0235244 A1 | 8/2014 | Hinman |
| 2014/0253378 A1 | 9/2014 | Hinman |
| 2014/0253402 A1 | 9/2014 | Hinman et al. |
| 2014/0254700 A1 | 9/2014 | Hinman et al. |
| 2014/0256166 A1 | 9/2014 | Ramos et al. |
| 2014/0320306 A1 | 10/2014 | Winter |
| 2014/0320377 A1 | 10/2014 | Cheng et al. |
| 2014/0328238 A1 | 11/2014 | Seok et al. |
| 2014/0341013 A1 | 11/2014 | Kumar |
| 2014/0355578 A1 | 12/2014 | Fink et al. |
| 2014/0355584 A1 | 12/2014 | Fink et al. |
| 2015/0002335 A1 | 1/2015 | Hinman et al. |
| 2015/0002354 A1 | 1/2015 | Knowles |
| 2015/0015435 A1 | 1/2015 | Shen et al. |
| 2015/0116177 A1 | 4/2015 | Powell et al. |
| 2015/0156642 A1 | 6/2015 | Sobczak et al. |
| 2015/0215952 A1 | 7/2015 | Hinman et al. |
| 2015/0256213 A1 | 9/2015 | Jan et al. |
| 2015/0256275 A1 | 9/2015 | Hinman et al. |
| 2015/0263816 A1 | 9/2015 | Hinman et al. |
| 2015/0319584 A1 | 11/2015 | Fink et al. |
| 2015/0321017 A1 | 11/2015 | Perryman et al. |
| 2015/0325945 A1 | 11/2015 | Ramos et al. |
| 2015/0327272 A1 | 11/2015 | Fink et al. |
| 2015/0365866 A1 | 12/2015 | Hinman et al. |
| 2016/0119018 A1* | 4/2016 | Lindgren ............ H04B 7/0613 375/219 |
| 2016/0149634 A1 | 5/2016 | Kalkunte et al. |
| 2016/0211583 A1 | 7/2016 | Lee et al. |
| 2016/0338076 A1 | 11/2016 | Hinman et al. |
| 2016/0365666 A1 | 12/2016 | Ramos et al. |
| 2016/0366601 A1 | 12/2016 | Hinman et al. |
| 2017/0048647 A1 | 2/2017 | Jung et al. |
| 2017/0201028 A1 | 7/2017 | Eberhardt et al. |
| 2017/0238151 A1 | 8/2017 | Fink et al. |
| 2017/0294975 A1 | 10/2017 | Hinman et al. |
| 2017/0353245 A1* | 12/2017 | Vardarajan ......... H04B 10/2939 |
| 2018/0034166 A1 | 2/2018 | Hinman |
| 2018/0035317 A1 | 2/2018 | Hinman et al. |
| 2018/0083365 A1 | 3/2018 | Hinman et al. |
| 2018/0084563 A1 | 3/2018 | Hinman et al. |
| 2018/0160353 A1 | 6/2018 | Hinman |
| 2018/0167105 A1 | 6/2018 | Vannucci et al. |
| 2018/0192305 A1 | 7/2018 | Hinman et al. |
| 2018/0199345 A1 | 7/2018 | Fink et al. |
| 2018/0241491 A1 | 8/2018 | Hinman et al. |
| 2019/0006789 A1 | 1/2019 | Ramos et al. |
| 2019/0182686 A1 | 6/2019 | Hinman et al. |
| 2019/0214699 A1 | 7/2019 | Eberhardt et al. |
| 2019/0215745 A1 | 7/2019 | Hinman |
| 2019/0273326 A1 | 9/2019 | Sanford et al. |
| 2020/0015231 A1 | 1/2020 | Fink et al. |
| 2020/0036465 A1 | 1/2020 | Hinman et al. |
| 2020/0067164 A1 | 2/2020 | Eberhardt et al. |
| 2020/0083614 A1 | 3/2020 | Sanford et al. |

FOREIGN PATENT DOCUMENTS

| | | |
|---|---|---|
| CN | 105191204 | 12/2015 |
| CN | 105191204 B | 5/2019 |
| EP | 1384285 B1 | 6/2007 |
| EP | 002640177 | 2/2015 |
| EP | 3491697 | 6/2019 |
| WO | WO2014137370 | 9/2014 |
| WO | WO2014138292 | 9/2014 |
| WO | WO2014193394 | 12/2014 |
| WO | WO2015112627 | 7/2015 |
| WO | WO2017123558 A1 | 7/2017 |
| WO | WO2018022526 A1 | 2/2018 |
| WO | WO2019136257 A1 | 7/2019 |
| WO | WO2019168800 A1 | 9/2019 |

OTHER PUBLICATIONS

Liu, Lingjia et al., "Downlink MIMO in LTE-Advanced: SU-MIMO vs. MU-MIMO," IEEE Communications Magazine, Feb. 2012, pp. 140-147.

International Search Report and "Written Opinion of the International Searching Authority," Patent Cooperation Treaty Application No. PCT/US2017/012884, dated Apr. 6, 2017, 9 pages.

International Search Report and Written Opinion of the International Search Authority dated Nov. 26, 2013 in Patent Cooperation Treaty Application No. PCT/US2013/047406, filed Jun. 24, 2013.

International Search Report and Written Opinion of the International Search Authority dated Aug. 9, 2013 in Patent Cooperation Treaty Application No. PCT/US2013/043436, filed May 30, 2013.

International Search Report and Written Opinion of the International Search Authority dated Jul. 1, 2014 in Patent Cooperation Treaty Application No. PCT/US2014/020880, filed Mar. 5, 2014.

International Search Report and Written Opinion of the International Search Authority dated Jun. 29, 2015 in Patent Cooperation Treaty Application No. PCT/US2015/012285, filed Jan. 21, 2015.

Hinman et al., U.S. Appl. No. 61/774,632, filed Mar. 7, 2013.

First Official Notification dated Jun. 15, 2015 in Chinese Design Patent Application 201530058063.8, filed Mar. 11, 2015.

Notice of Allowance dated Sep. 8, 2015 in Chinese Design Patent Application 201530058063.8, filed Mar. 11, 2015.

Final Office Action, dated Sep. 21, 2017, U.S. Appl. No. 15/246,118, filed Aug. 24, 2016.

Notice of Allowance, dated Sep. 29, 2017, U.S. Appl. No. 15/139,225, filed Apr. 26, 2016.

Notice of Allowance, dated Oct. 10, 2017, U.S. Appl. No. 15/224,412, filed Jul. 29, 2016.

Final Office Ation, dated Oct. 24, 2017, U.S. Appl. No. 14/316,537, filed Jun. 26, 2014.

Final Office Action, dated Nov. 14, 2017, U.S. Appl. No. 14/198,473, filed Mar. 5, 2014.

Non-Final Office Action, dated Nov. 16, 2017, U.S. Appl. No. 15/625,984, filed Jun. 16, 2017.

"Office Action," Chinese Patent Application No. 201580000078.6, dated Nov. 3, 2017, 5 pages [10 pages including translation].

"International Search Report" and "Written Opinion of the International Searching Authority," Patent Cooperation Treaty Application No. PCT/US2017/043560, dated Nov. 16, 2017, 11 pages.

"Office Action," Chinese Patent Application No. 201580000078.6, dated Oct. 31, 2018, 3 pages.

"International Search Report" and "Written Opinion of the International Search Authority," dated May 23, 2019 in Patent Cooperation Treaty Application No. PCT/US2019/019462, filed Feb. 25, 2019, 8 pages.

Teshirogi, Tasuku et al., "Wideband Circularly Polarized Array Antenna with Sequential Rotations and Phase Shift of Elements," Proceedings of the International Symposium on Antennas and Propagation, 1985, pp. 117-120.

(56) References Cited

OTHER PUBLICATIONS

"Office Action," Chinese Patent Application No. 201580000078.6, dated Jul. 30, 2018, 5 pages [11 pages including translation].

"Office Action," Chinese Patent Application No. 201580000078.6, dated Oct. 31, 2018, 3 pages [6 pages including translation].

"Notice of Allowance," Chinese Patent Application No. 201580000078. 6, dated Feb. 11, 2019, 2 pages.

"International Search Report" and "Written Opinion of the International Search Authority," dated Mar. 22, 2019 in Patent Cooperation Treaty Application No. PCT/US2019/012358, filed Jan. 4, 2019, 9 pages.

FCC Regulations, 47 CFR § 15.407, 63 FR 40836, Jul. 31, 1998, as amended at 69 FR 2687, Jan. 20, 2004; 69 FR 54036, Sep. 7, 2004; pp. 843-846.

"Sector Antennas," Radiowaves.com, [online], [retrieved Oct. 10, 2019], Retrieved from the Internet: <URL:https://www.radiowaves.com/en/products/sector-antennas>, 4 pages.

KP Performance Antennas Search Results for Antennas, Sector, Single, [online], KPPerformance.com [retrieved Oct. 10, 2019], Retrieved from the Internet: <URL:https://www.kpperformance.com/search?Category=Antennas&Rfpsan99design=Sector&Rfpsan99option=Single&view_type=grid>, 6 pages.

"Partial Supplemental European Search Report," European Patent Application No. 17835073.2, dated Feb. 13, 2020, 17 pages.

"Wireless Access Point," Wikipedia.org, Jan. 6, 2020 [retrieved on Feb. 3, 2020], Retrieved from the Internet: <https://en.wikipedia.org/wiki/Wireless_access_point>, 5 pages.

"Extended European Search Report", European Patent Application No. 17835073.2, dated Jun. 30, 2020, 15 pages.

Haupt, R.T., "Antenna Arrays: A Computational Approach", Chapter 5: Non-Planar Arrays; Wiley-IEEE Press (2010), pp. 287-338.

Dowla, Farid et al., "RF and Wireless Technologies: Know It All", Netherlands, Elsevier Science, 2008, p. 314.

\* cited by examiner

WI-FI HOTSPOT REPEATER

CROSS REFERENCE TO RELATED APPLICATIONS

This application claims the priority benefit of U.S. Provisional Patent Application Ser. No. 62/047,640, filed on Sep. 8, 2014, titled "Wi-Fi Hotspot Repeater", which is hereby incorporated by reference herein in its entirety, including all references cited therein.

FIELD OF THE INVENTION

The present technology is generally related to a wireless networking, and more specifically, but not by way of limitation to a wireless repeater that is configured to be positioned on a window. The wireless repeater provides an access point/interface between outdoor hotspots that broadcast in 5 GHz frequency and indoor clients that use 2.4 GHz frequency.

SUMMARY

According to some embodiments, the present technology is directed to a repeater device, comprising: (a) an enclosure that is configured to be mounted to a window that divides an outdoor area from an indoor area, the enclosure housing: (b) a 5 GHz WiFi client radio coupled with a high order MIMO (multiple input, multiple output) antenna, the high order MIMO antenna transmitting and receiving data from a 5 GHz access point located in the outdoor area; and (c) a 2.4 GHz WiFi access point radio coupled with a MIMO (multiple input, multiple output) antenna, the MIMO antenna transmitting and receiving data from 2.4 GHz UEs (User Equipment) located in the indoor area.

According to other embodiments, the present technology is directed to a repeater device, comprising: (a) an enclosure that is configured to be mounted to a window that divides an outdoor area from an indoor area, the enclosure housing: (b) a first radio operating on a first frequency, the radio coupled with a first antenna, the first antenna transmitting and receiving data from an outdoor access point located in the outdoor area; and (c) an access point radio coupled with a second antenna, the second antenna transmitting to and receiving data from UEs located in the indoor area using a second frequency.

According to other embodiments, the present technology is directed to a repeater device, comprising: (a) an enclosure that is configured to be mounted to a window that divides an outdoor area from an indoor area, the enclosure housing: (b) a first radio operating on a first frequency, the radio coupled with a first antenna, the first antenna receiving data from an outdoor access point located in the outdoor area; (c) a microprocessor that converts the data from the first frequency to a second frequency and data from the second frequency to the first frequency; (d) an interface for coupling with a wireless router, the wireless router transmitting the converted data to UEs located in the indoor area using the second frequency.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown in block diagram form only in order to avoid obscuring the disclosure.

In general, the present technology is directed to a repeater device that functions as a communications gateway between outdoor hotspots, which operate at 5 GHz, and indoor UEs that utilize 2.4 GHz frequency for communication. Broadly, the present technology functions as a WiFi-to-home network gateway.

This repeater device provides a communications gateway that comprises a first radio that operates a first frequency and a second radio that operates on a second frequency. The repeater device includes a microprocessor that is configured to receive and convert data packets having the first frequency into data packets having the second frequency. The repeater device then transmits the converted packets to 2.4 GHz UEs in an indoor area.

Broadly, the microprocessor is configured to convert data packets from 5 GHz to 2.4 GHz and from 2.4 GHz to 5 GHz as needed. For example, data packets received from the 5 GHz WiFi hotspot are converted into 2.4 GHz data packets that are transmitted to UEs in the indoor area.

Similarly, data packets received from the UEs in 2.4 GHz frequency are converted into 5 GHz data packets that are transmitted to the 5 GHz WiFi hotspot. Again, the 5 GHz and 2.4 GHz frequencies are merely example frequencies that can be used. The repeater device can be configured to convert data packets between any two different frequencies and facilitate transmission of the converted data packets between outdoor hotspots and indoor UEs.

With increasing deployment of Metro Wi-Fi hotspots in outdoor settings, it is desirable to leverage that infrastructure for indoor use. In the past, attempts to connect from indoor clients to outdoor access points have been marginally successful. This lack of success is due, in part, to low power clients having low gain antennas that have difficulty coupling with outdoor Wi-Fi hotspots. These connectivity issues are compounded when the path between the indoor client and the outdoor access point is obstructed. For example, obstructions can cause a SNR (signal to noise) in the wireless that is marginal, resulting in a slow transmission speed and high latency due to excessive packet re-transmission. That is, when the SNR is marginal to low, packets transmitted between the indoor clients and outdoor access points are lost and must be re-transmitted.

Figure 1:
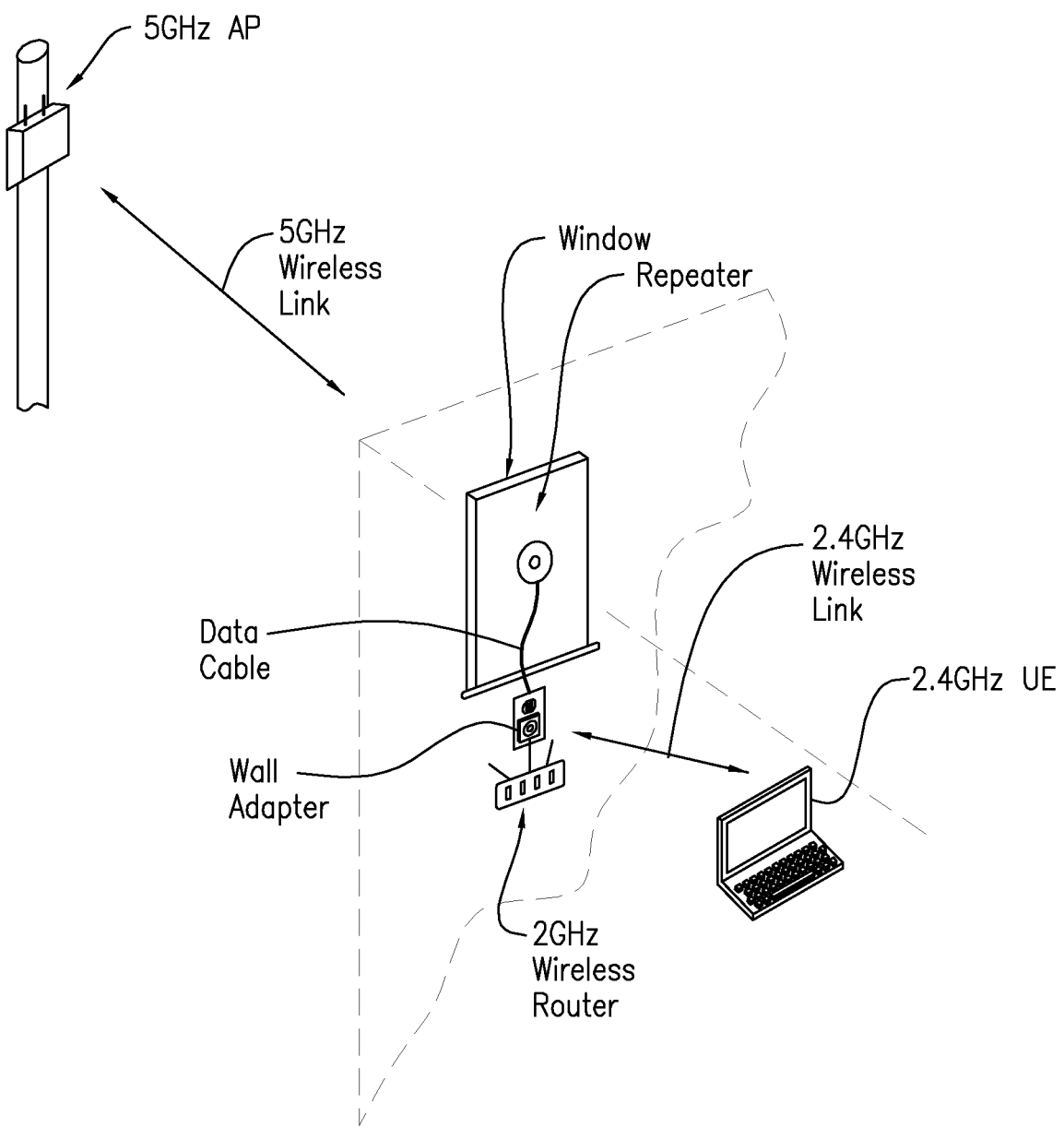
FIG. 1 is a perspective view of a repeater device of the present technology, as well as an outdoor access point and indoor UEs.
Figure 2:
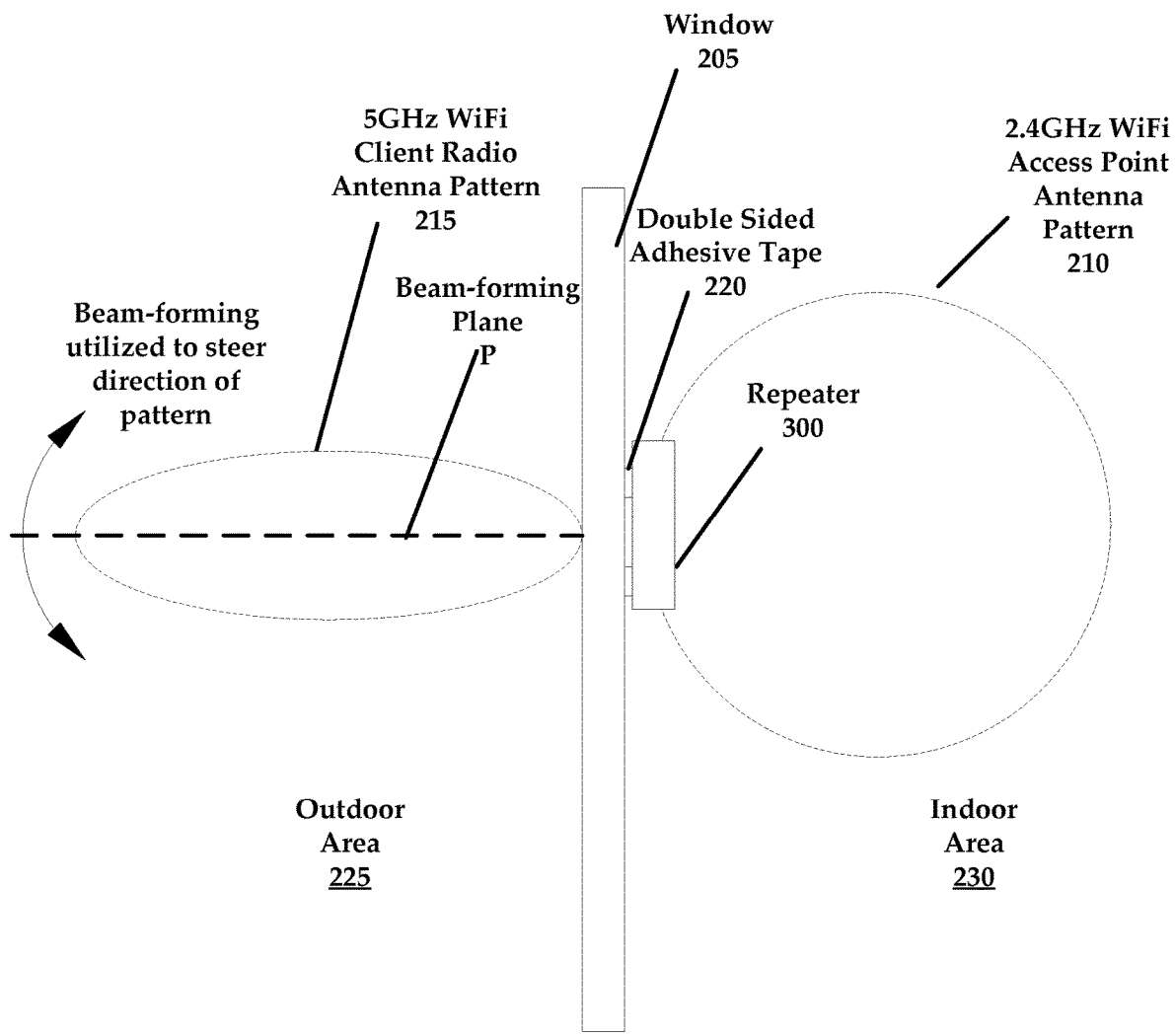
FIG. 2 is a side view of the repeater device of FIG. 1 mounted on a window.
Figure 3:
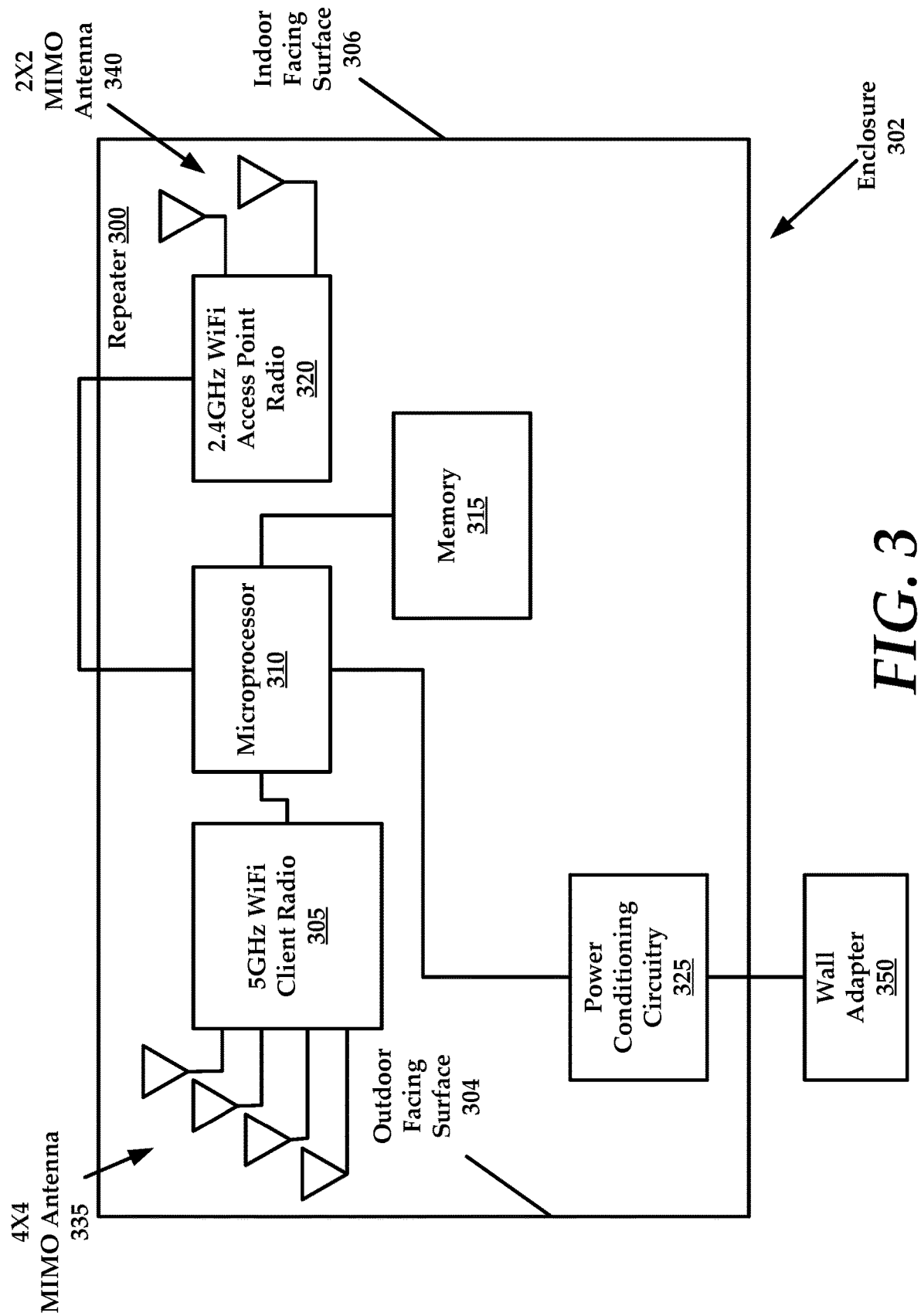
FIG. 3 is a schematic diagram of an example repeater device, constructed in accordance with the present technology.

Referring now to FIGS. 1-3 collectively, the present technology, in one embodiment, comprises a window-mounted Wi-Fi repeater 300 (also referred to herein as the "repeater" or the "repeater device") that is configured to leverage outdoor hotspots for indoor use.

In one embodiment, the repeater 300 comprises a 5 GHz Wi-Fi client (e.g., node) radio 305, a microprocessor 310, memory 315, a 2.4 GHz Wi-Fi access point radio 320, power conditioning circuitry 325, a 4×4 MIMO (multiple input, multiple output) antenna 335, and a 2×2 MIMO antenna 340.

The 5 GHz Wi-Fi client radio 305 comprises a directional antenna that is positioned toward the outside of the window to pick-up the signal from the 5 GHz access point. A high-order MIMO radio, such as the 4×4 MIMO antenna 335 is desirable in the 5 GHz WiFi client radio 305, as antenna beam-forming provided by a high order MIMO radio allows the maximum gain to be steered in a direction that is advantageous for the 5 GHz access point to which the repeater 300 is coupled. The maximum gain point need not be fixed necessarily normal to the window plane.

FIG. 2 illustrates antenna beam-forming relative to a beam-forming plane that is normal N to the window 205. The radiation of the MIMO antenna 335 can be translated upwardly and/or downwardly (as well as side-to side) to direct the antenna radiation as needed. In one instance, the 5 GHz access point is not to be located in a direction that is perfectly linear to the repeater 300. For example, the 5 GHz access point can be position above, below, and/or to the side of the repeater 300. Beam-forming steers the antenna radiation towards the 5 GHz access point so as to maximize signal strength.

Data packets received by the 5 GHz WiFi client radio 305 are processed through a microprocessor 310, and then relayed to a 2.4 GHz Wi-Fi access point radio 320.

With antenna gain toward the inside of the home or office, the 2.4 GHz Wi-Fi access point radio 320 re-transmits the data packets to wireless devices, such as 2.4 GHz User Equipment (UE) that have 2.4 GHz client radios. In the reverse direction, upstream packets from the 2.4 GHz UEs are received by the 2.4 GHz Wi-Fi access point radio 320 of the repeater, over the 2.4 GHz wireless link, processed through the microprocessor 310, and re-transmitted to the 5 GHz access point over the 5 GHz wireless link.

Logic for converting the 5 GHz data packets to 2.4 GHz data packets, and vice-versa is stored in memory 315, as well as beam-forming logic. The microprocessor 310 executes the logic stored in memory 315 to accomplish functions such as beam-forming and data packet conversion, as needed.

In one embodiment, the repeater 300 is enclosed in a plastic enclosure 302 that allows the 2.4 GHz signals (2.4 GHz WiFi Access Point Antenna Pattern 210) and 5 GHz signals (5 GHz WiFi Client Radio Antenna Pattern 215) to reach the respective radios with minimal loss. It is mounted to a window using double-sided adhesive tape 220, allowing it to be removed later, but providing adequate strength for reliable attachment. Other suitable methods for attaching the repeater 300 to a window or other portion of a structure are also likewise contemplated for use in accordance with the present technology.

In one embodiment, the window separates an outdoor area 225 from an indoor area 230. The 5 GHz access point is position in the outdoor area and the 2.4 GHz UEs are positioned in the indoor area. The 4×4 MIMO antenna 335 transmits and receives data from a 5 GHz access point located in the outdoor area, while the 2×2 MIMO antenna 340 transmits and receives data from a 2.4 GHz UEs located in the indoor area. In one embodiment, the repeater 300 is positioned on the inside of the window within the indoor area. For example, the 5 GHz access point is located in an outside area such as a street lamp, an antenna tower, a building top or other common outdoor location/structure.

The 4×4 MIMO antenna 335 is disposed proximate an outdoor facing surface 304 of the enclosure of the repeater 300. Also, the 2×2 MIMO antenna 340 is disposed proximate an indoor facing surface 306 of the enclosure of the repeater 300.

As illustrated in FIG. 3, the 5 GHz WiFi client radio 305 transmits and receives data packets through an outdoor oriented surface of the enclosure. The outdoor oriented surface of the enclosure is positioned proximate to and facing the window. The 2.4 GHz WiFi access point radio 320 transmits and receives data packets through an indoor oriented surface of the enclosure. The indoor oriented surface is positioned opposite the outdoor oriented surface.

A data cable such as CAT5E is used to connect the repeater 300 to a power-over-Ethernet wall adapter, such as wall adapter 350, which adapts AC power to low-voltage DC power to operate one or more radios. The data cable coupling the repeater with the wall adapter can comprise a PoE (power over Ethernet) cable. For context, PoE uses an 8-conductor cable that carries both power and Ethernet over four twisted pairs.

The data cable from the repeater 300 could alternatively be a simple two-conductor version and the wall adapter can be a simple AC power converter such as those used for other DC-powered devices. The repeater 300 can use the power conditioning circuitry 325 to adapt the AC power to DC power.

Figure 4:
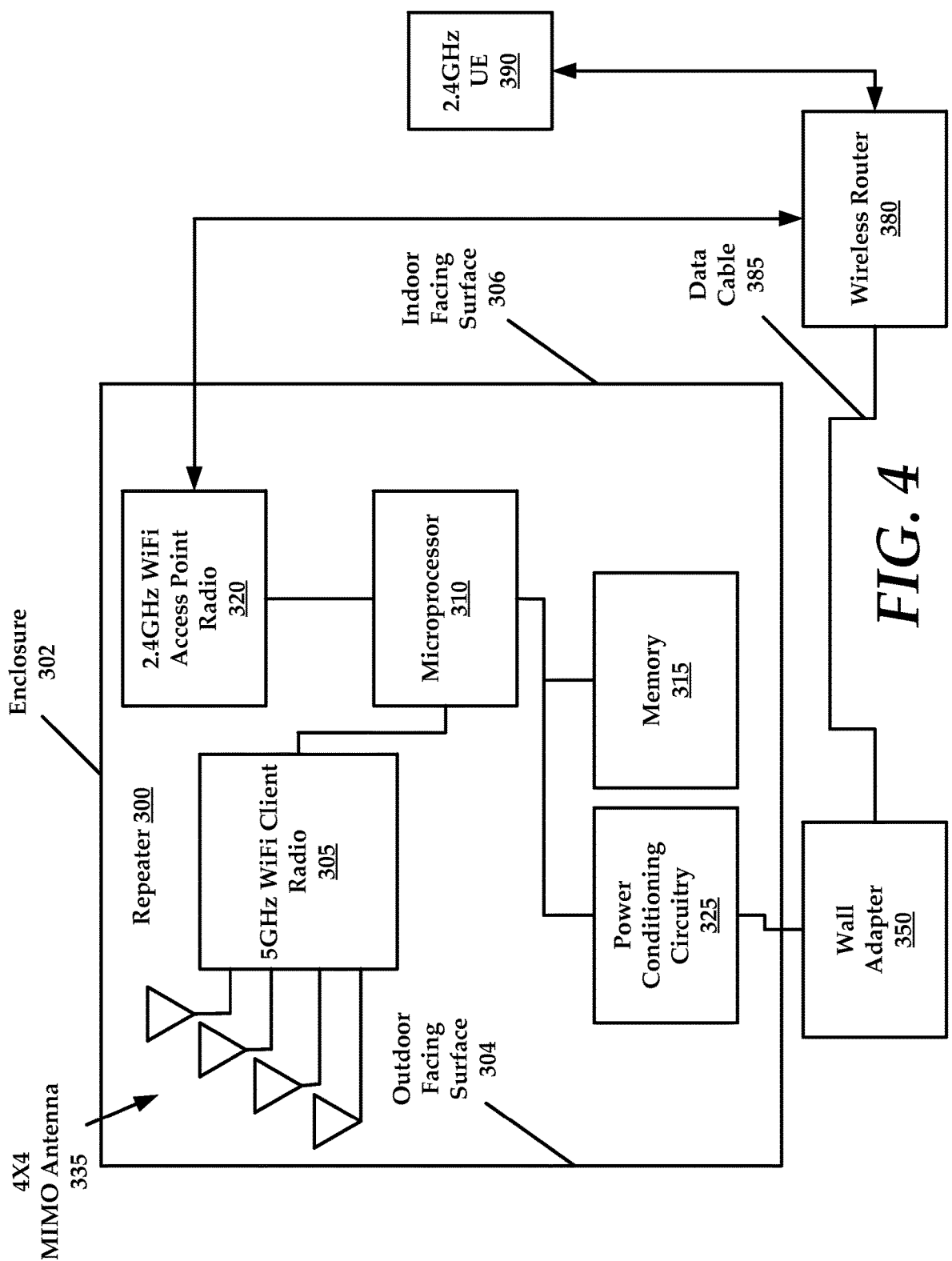
FIG. 4 is a schematic diagram of an example repeater device that couples with an indoor wireless router.

Referring now to FIG. 4, in one embodiment, the repeater 300 can be communicatively coupled with a wireless router 380 that functions as an indoor access point for 2.4 GHz devices located indoors, such as in a home, office, or other building. Thus, the repeater 300 may not require the 2.4 GHz Wi-Fi access point radio 320, but may use a 2.4 GHz Wi-Fi access point radio of the wireless router 380. The repeater 300 can couple with the wireless router also using another data cable 385 that extends from the wall adapter 350. In another embodiment, rather than using a physical data cable 385, the repeater 300 can communicate with the wireless router 380 using the 2.4 GHz Wi-Fi access point radio 320 such that the repeater can be coupled with an existing wireless router 380 in a building. The wireless router 380 will then transmit and receive data from 2.4 GHz UEs 390 in the building.

In some embodiments, the repeater can couple with a dual-band wireless router (e.g., both 2.4 GHz and 5 GHz). The distance between the repeater and the wireless router allows a 5 GHz client and a 5 GHz access point to coexist, without synchronization, provided they are on different channels and far enough apart. This would not be feasible when the client and access point are within the same enclosure though.

In some embodiments, the repeater device 300 (and more specifically the microprocessor) can be configured to provide firewall or other similar security features. That is, the repeater device 300 provides the ability to create a private network within the indoor area using the 2.4 GHz Wi-Fi access point radio 320. Indeed, there may be numerous 2.4 GHz UEs that are joined to the private network created by the repeater device 300. Thus, the repeater device 300 employs network security features to prevent access to the private network from other users that may be using the 5 GHz access point. Similarly, the repeater device 300 can selectively prevent network traffic created on the private network from being transmitted over the 5 GHz network of the 5 GHz access point. Therefore, the repeater device 300 is advantageously capable of providing network address translation functionality to bridge communications between the 5 GHz network of the 5 GHz access point and the private network created for the UEs.

Figure 5:
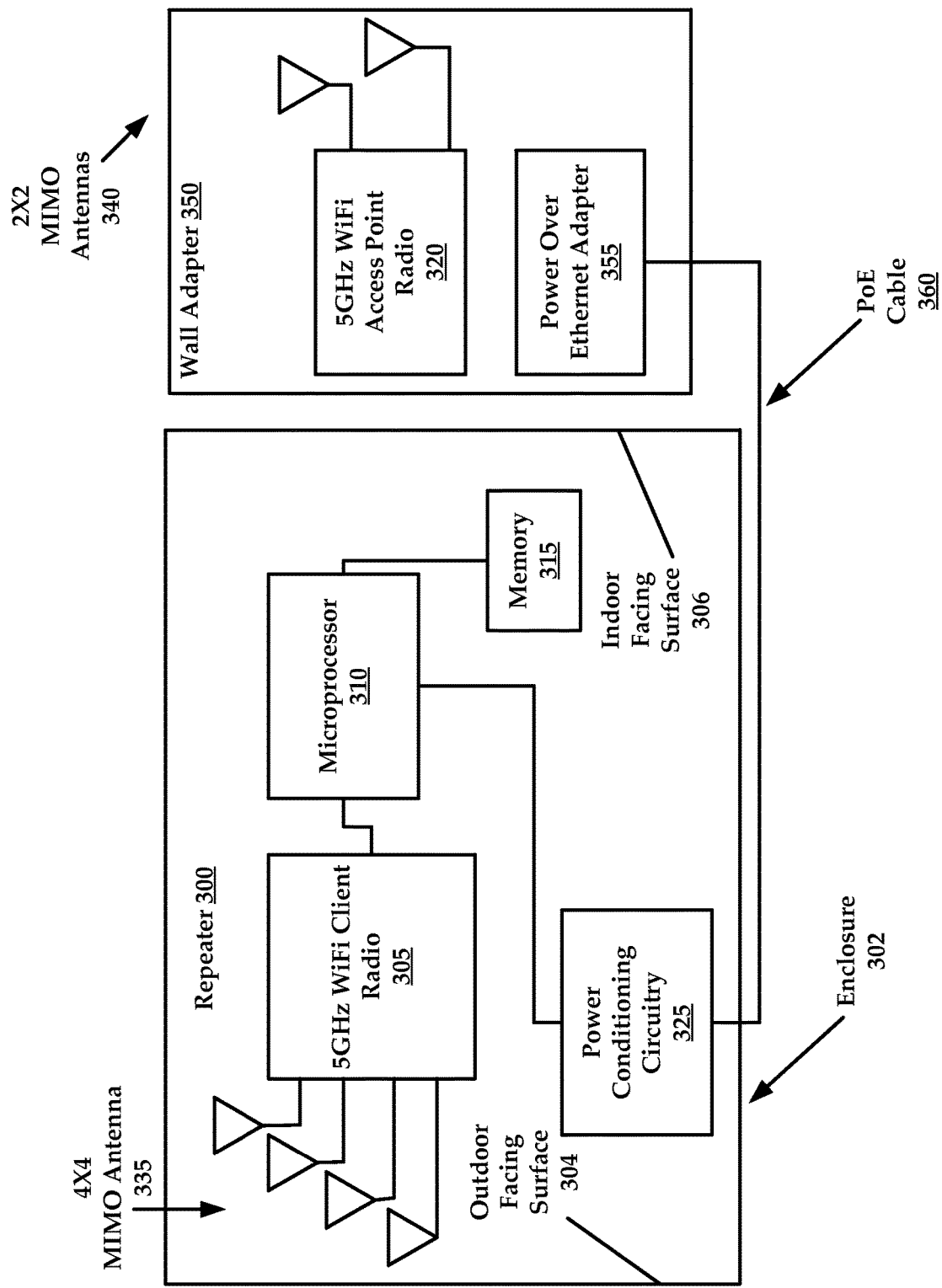
FIG. 5 is a schematic diagram of another example repeater device that couples with an indoor wireless router.

FIG. 5 illustrates another embodiment of a repeater 300 where portions are divided between an enclosure 302 and a wall adapter 350. For example, the enclosure 302 can include the microprocessor 310 and 5 GHz Wi-Fi client radio 305, as well as power conditioning circuitry 325 and memory 315. A second 5 GHz Wi-Fi access point radio 320 and power over Ethernet adapter 355 are positioned in a wall adapter 350. In some embodiments, the second 5 GHz Wi-Fi access point radio 320 can include a dual band radio that utilizes both 2.4 GHz and 5 GHz frequencies.

The second 5 GHz Wi-Fi access point radio 320 can therefore electrically and communicatively couple with the components positioned within the enclosure 302, such as the microprocessor 310 using a power over Ethernet cable 360, or other similar physical power and data connection that would be known to one of ordinary skill in the art. The wall adapter 350 that comprises the second 5 GHz Wi-Fi access point radio 320 and power over Ethernet adapter 355 can be referred to as a PoE gateway.

According to some embodiments, the repeaters described herein can be configured to reduce or eliminate interference on 5 GHz channels. For example, the repeaters can implement a PoE gateway as described above which coordinates with the 5 GHz outdoor access point on a roof of a house, to coordinate 5 GHz channels so as to not cause interference. For example, the microprocessor of the repeater can be configured to pick a new channel when instructed by the 5 GHz access point and dynamically maintaining this function as the outdoor access point may change channels over time.

This methodology is distinguished from clear channel selection methods where an AP or other wireless networking device will scan for an optimal clear channel upon boot up or initialization and/or periodically.

In one embodiment, the 5 GHz Wi-Fi client radio 305 receives data from the 5 GHz access point on a first channel. The microprocessor 310 will utilize the first channel and instruct the second 5 GHz Wi-Fi access point radio 320 to utilize the first channel until instructed to change channels.

According to some embodiments, the 5 GHz access point may determine to select a new channel. For example, if another outdoor access point or other wireless AP in the area begins to utilize portions of the frequency spectrum currently utilized by the 5 GHz outdoor access point, the outdoor access point may selectively change the portion of the spectrum that it utilizes by selecting a new or updated channel.

The outdoor access point transmits a channel change signal that is received by the repeater 300. The repeater 300 receives the channel change signal using the 5 GHz Wi-Fi client radio 305. The microprocessor 310 detects the channel change request and then transmits a request to change of the first channel used by the first radio (5 GHz Wi-Fi client radio 305) and the second 5 GHz Wi-Fi access point radio 320 (also referred to as an access point radio) to a second channel. The UEs communicating with the second 5 GHz Wi-Fi access point radio 320 will detect the channel change and adjust their communication procedures as necessary. In sum, the channel change process includes propagation of a channel change request from the outdoor access point to the window mounted repeater that includes the 5 GHz WiFi client radio 305. The 5 GHz Wi-Fi client radio propagates the channel change request to the second 5 GHz Wi-Fi access point radio 320 disposed in a wall adapter. The channel change request is then propagated out to the UEs that are communicatively coupled with the second 5 GHz WiFi access point radio 320.

To be sure, the 5 GHz Wi-Fi Client Radio 305 can be collocated in the same enclosure with the second 5 GHz Wi-Fi access point radio 320, such as in enclosure 302 as in embodiments disclosed above. In other embodiments, the 5 GHz Wi-Fi Client Radio 305 can be disposed with the enclosure 302 while the second 5 GHz Wi-Fi access point radio 320 is disposed within the wall adapter 350.

In another example embodiment, the wall adapter 350 of FIG. 5 could comprise a 2.4 GHz Wi-Fi access point radio, rather than the second 5 GHz Wi-Fi access point radio 320. The microprocessor 310 can be utilized to control the 2.4 GHz Wi-Fi access point radio 320 as required.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A repeater device, comprising:
an enclosure that is configured to be mounted to a window that divides an outdoor area from an indoor area, the enclosure comprising an indoor oriented surface and an outdoor oriented surface, the enclosure having disposed therein:
   a 5 GHz WiFi client radio coupled with a high order MIMO (multiple input, multiple output) antenna, the high order MIMO antenna being at least 4×4, the high order MIMO antenna transmitting and receiving data from a 5 GHz access point located in the outdoor area, wherein the high order MIMO antenna is oriented towards an outdoor facing surface of the enclosure and transmitting the data through the outdoor oriented surface of the enclosure and receives data from the 5 GHz access point on a first channel, the 5 GHz WiFi client radio communicating with 5 GHz (User Equipments) UEs in the indoor area;
   a 2.4 GHz WiFi access point radio coupled with a 2×2 MIMO (multiple input, multiple output) antenna, the 2×2 MIMO antenna transmitting and receiving data from 2.4 GHz UEs located in the indoor area, wherein the 2×2 MIMO antenna is oriented towards an indoor facing surface of the enclosure and transmitting the data through the indoor oriented surface of the enclosure;
   a microprocessor controlling both the 5 GHz WiFi client radio and the 2.4 GHz WiFi access point radio, the microprocessor configured to:
      receive a channel change signal transmitted to the 5 GHz WiFi client radio by the 5 GHz outdoor access point;
      request a change of the first channel used by the 5 GHz WiFi client radio and the access point radio to a second channel;
      transmit a signal change signal to the 5 GHz UEs informing the 5 GHz UEs of the change to the second channel;
      convert 5 GHz data received by the 5 GHz WiFi client radio into 2.4 GHz data;
      convert 2.4 GHz data received by the 2.4 GHz WiFi access point radio into 5 GHz data, the microprocessor disposed within the enclosure and coupled with both the 5 GHz WiFi client radio and the 2.4 GHz WiFi access point radio; and
      beam form a beam of the high order MIMO antenna to maximize a signal strength of an output directed towards the 5 GHz access point in a direction that is parallel and relative to a beam-forming plane that is normal to the window; and
   a wireless interface for coupling with a wireless router, the wireless router transmitting converted data to the 5 GHz UEs and the 2.4 GHz UEs located in the indoor area, the wireless interface being disposed within a wall adapter that can electrically couple with an electrical outlet.

2. A repeater device, comprising:
an enclosure that is configured to be mounted to a window that divides an outdoor area from an indoor area, the enclosure housing:
   a first radio operating on a first frequency, the first radio coupled with a first antenna which is at least a 4×4, high-order Multiple Input Multiple Output (MIMO) antenna, the first antenna transmitting and receiving data from an outdoor access point located in the outdoor area, wherein the first antenna is oriented towards an outdoor facing surface of the enclosure and the first radio receives the data on a first channel from the outdoor access point and communicates with UEs (User Equipments) in the indoor area;
   an access point radio coupled with a second antenna that is a 2×2 MIMO antenna, the second antenna transmitting to and receiving data from UEs located in the indoor area using a second frequency, wherein the second antenna is oriented towards an indoor facing surface of the enclosure; and
   a microprocessor that is configured to convert data having the first frequency received by the first radio into data having the second frequency and convert data having the second frequency received by the access point radio into data having the first frequency, the microprocessor disposed within the enclosure and coupled with both the first radio and the access point radio, the microprocessor controlling both the first radio and the access point radio, the microprocessor being further configured to:
      receive a channel change signal from the first radio transmitted by the outdoor access point;
      request a change of the first channel used by the first radio and the access point radio to a second channel;
      transmit a signal change signal to the UEs informing the UEs of the change to the second channel; and
      provide beam forming a beam of the first antenna to maximize a signal strength of an output of the first radio directed towards the outdoor access point in a direction that is parallel and relative to a beam-forming plane that is normal to the window.

3. The repeater device according to claim 2, wherein the first frequency and the second frequency are different from one another.

4. The repeater device according to claim 3, wherein the first frequency is 5 GHz and the second frequency is 2.4 GHz.

5. The repeater device according to claim 2, further comprising a data cable coupled to the repeater device and a wall adapter.

6. The repeater device according to claim 2, wherein the first antenna is disposed proximate the window and the second antenna is disposed away from the window.

7. The repeater device according to claim 2, wherein the first antenna uses beam-forming which allows a maximum gain for radiation produced by the first antenna to be steered in a direction that is advantageous for communicating with the outdoor access point.

8. The repeater device according to claim 2, wherein the microprocessor is configured to implement firewall policies to secure a private network created by the repeater device for the UEs located in the indoor area.

9. The repeater device according to claim 2, further comprising a wall adapter that comprises a power over Ethernet adapter that electrically and communicatively couples a wireless interface with the microprocessor and first radio using a power over Ethernet connection.

10. A repeater device, comprising:
   an enclosure that is configured to be mounted to a window that divides an outdoor area from an indoor area, the enclosure housing:
      a first radio operating on a first frequency, the first radio coupled with a first antenna which is a 4×4, high-order MIMO (multiple input, multiple output) antenna, the first antenna receiving data from an outdoor access point located in the outdoor area, wherein the first antenna is oriented towards an outdoor facing surface of the enclosure that is against the window, the first radio receiving the data on a first channel from the outdoor access point, the first radio communicating with UEs (User Equipments) in the indoor area;
      a microprocessor that converts the data from the first frequency to a second frequency and data from the second frequency to the first frequency, the microprocessor disposed within the enclosure and coupled with both the first radio and a second radio, the microprocessor controlling both the first radio and the second radio, the microprocessor being further configured to:
         receive a channel change signal from the first radio transmitted by the outdoor access point;
         request a change of the first channel used by the first radio and the access point radio to a second channel;
         transmit a signal change signal to the UEs informing the UEs of the change to the second channel; and
         provide beam forming a beam of the first antenna to maximize a signal strength of an output of the first radio directed towards the outdoor access point in a direction that is parallel and relative to a beam-forming plane that is normal to the window; and
      a wireless interface for coupling with a wireless router, the wireless router transmitting the converted data to UEs located in the indoor area using the second frequency.

11. The repeater device according to claim 10, wherein the first frequency and the second frequency are different from one another.

12. The repeater device according to claim 11, wherein the first frequency is 5 GHz and the second frequency is 2.4 GHz.

13. The repeater device according to claim 10, wherein the first antenna is disposed proximate the window.

14. The repeater device according to claim 10, further comprising a data cable coupled to the repeater device and a wall adapter.

15. The repeater device according to claim 14, wherein the wall adapter comprises a power over Ethernet adapter that electrically and communicatively couples the wireless interface with the microprocessor and first radio using a power over Ethernet connection.

16. The repeater device according to claim 1, further comprising a second 5 GHz WiFi access point radio disposed in the wall adapter, the 5 GHz WiFi client radio propagating the channel change signal to the second 5 GHz WiFi access point radio.

* * * * *